Dec. 20, 1960 O. H. MILMORE 2,965,431

FLUCTUATING DATA RECORDER

Filed June 25, 1957 3 Sheets-Sheet 1

INVENTOR:
Oswald H. Milmore

Dec. 20, 1960 O. H. MILMORE 2,965,431

FLUCTUATING DATA RECORDER

Filed June 25, 1957 3 Sheets-Sheet 2

INVENTOR:

Oswald H. Milmore

INVENTOR:
Oswald H. Milmore

United States Patent Office 2,965,431
Patented Dec. 20, 1960

2,965,431

FLUCTUATING DATA RECORDER

Oswald H. Milmore, Berkeley, Calif., assignor to Shell Oil Company, a corporation of Delaware Filed June 25, 1957, Ser. No. 667,881

4 Claims. (Cl. 346—33)

The invention relates to the preparation of records of fluctuating data, such as pressure, temperature, and flow rates, and is especially, although not exclusively, applicable to recording such data in orthochronistic relation to other data which may be monotonic in nature, i.e., which changes progressively in one sense, such as the passage of time, the quantitative flow of a fluid, the counting of objects, etc. Such records are also known as linear time-base event recordings.

The invention is particularly concerned with a method and apparatus for transducing such data into two series of signals which represent, respectively, increments and decrements in the value of the fluctuating variable, and for recording such data on two channels of a multi-channel recording machine.

Monotonic data are readily recorded on separate, parallel channels of record media, such as paper tape, by placing in each channel a series of like marks, e.g., holes, pertaining to one element of data and denoting successive increments in such data. However, fluctuating data cannot be so represented, and in one prior system they have been recorded by converting the magnitude into a frequency indicative of the magnitude and making a series of marks in one record channel at the said frequency. One drawback of such a procedure is that the frequency is discernible only when the record includes a time scale, e.g., when it is advanced through the recorder at a fixed time rate or contains a series of isochronistic marks in one record channel; it thereby becomes impossible during subsequent analysis of the record to make a comparison simply between the fluctuating data and another element of data other than time. Moreover, the precision possible by means of frequency indications is dependent upon the number of marks used, so that comparatively long records are often required to attain the required precision. This becomes impracticable in cases where long tests are recorded and it is desired, for reasons of economy, to advance the record only at long time intervals, such as five to one hundred seconds. Finally, it is often difficult to determine the frequency, particularly when the time marks are not spaced apart at equal distances on the record, a situation which is encountered when the record contains also items of data other than time, recorded on separate channels, and the record is advanced each time a mark is entered in any channel.

It is an object of the invention to provide an improved method and apparatus for recording fluctuating data in a form which permits a greater precision of the record and which makes it possible, during subsequent analysis, to make a direct comparison between the magnitude of such fluctuating data and another element of data which may be fluctuating or monotonic and which may be time or a variable other than time.

A further object is to provide a system of making a record of a fluctuating variable and another variable wherein the data are recorded in orthochronistic relation and the prevailing value of the fluctuating variable can be easily ascertained at any part of the record.

Still another object is to provide improved apparatus for generating a series of signals, such as electrical pulses, in two channels, for indicating increments and decrements of the variable. Ancillary objects are to provide means for resetting the apparatus to a reference value to obtain an indication of the absolute value of the fluctuating variable; and to provide a system wherein such signals are emitted at a rate controlled by a recording machine so as to insure the recordation of all signals despite the utilization of the recording machine which is used also to record additional data in other record channels.

Further objects will appear from the following description.

In summary, according to the invention the apparatus provides a signal emitter, such as an electrical pulser, which has two outputs each of which emits a separate series of signals such that the number of signals indicates the extent of change in one sense of the magnitude of the fluctuating variable, the signals at one output indicating increments and those at the other indicating decrements. Each of the outputs is connected to a separate input of a multi-channel recording machine, such as a tape-punching machine, other inputs of which are connected to signal emitters giving information of other variables, whereby a record of the data in orthochronistic form is prepared. The apparatus in its preferred form further includes means for resetting it to a reference value so that immediately following or during the resetting operation there is emitted a series of signals indicating the difference between the prevailing value of the fluctuating variable and the reference value.

Recordation of all of the signals emitted in the two outputs may be insured by constructing the apparatus of the invention to operate slower than or, at least, not faster than the recording machine. However, in the preferred embodiments to be described the apparatus is controlled by the recorder to emit each signal only after the recording machine has recorded the preceding signal, this being particularly desirable when the recorder is used to record also other items of data.

Resetting may be effected in several ways. According to one embodiment a movable member is returned to a reference position, which may be adjustable; according to another, the measuring device which senses the value of the fluctuating variable is provided with scanning means for connecting it to a reference input during the resetting period. In either arrangement, the apparatus can be constructed either to emit pulses during the resetting period or to return to the reference point without emitting signals; the former has the advantage that it provides a check on the accuracy of the record in that, because the record commences and ends with the reference value, the sum of all marks in the increment channel must equal that in the decrement channel; the latter has the advantage of economizing on the length of the record and, in some instances, of permitting a more rapid resetting.

Having thus outlined the general nature of the invention, it will be described in detail with reference to the accompanying drawings forming a part of this specification and showing three preferred embodiments, wherein.

*First embodiment*

Figures 1, 2:
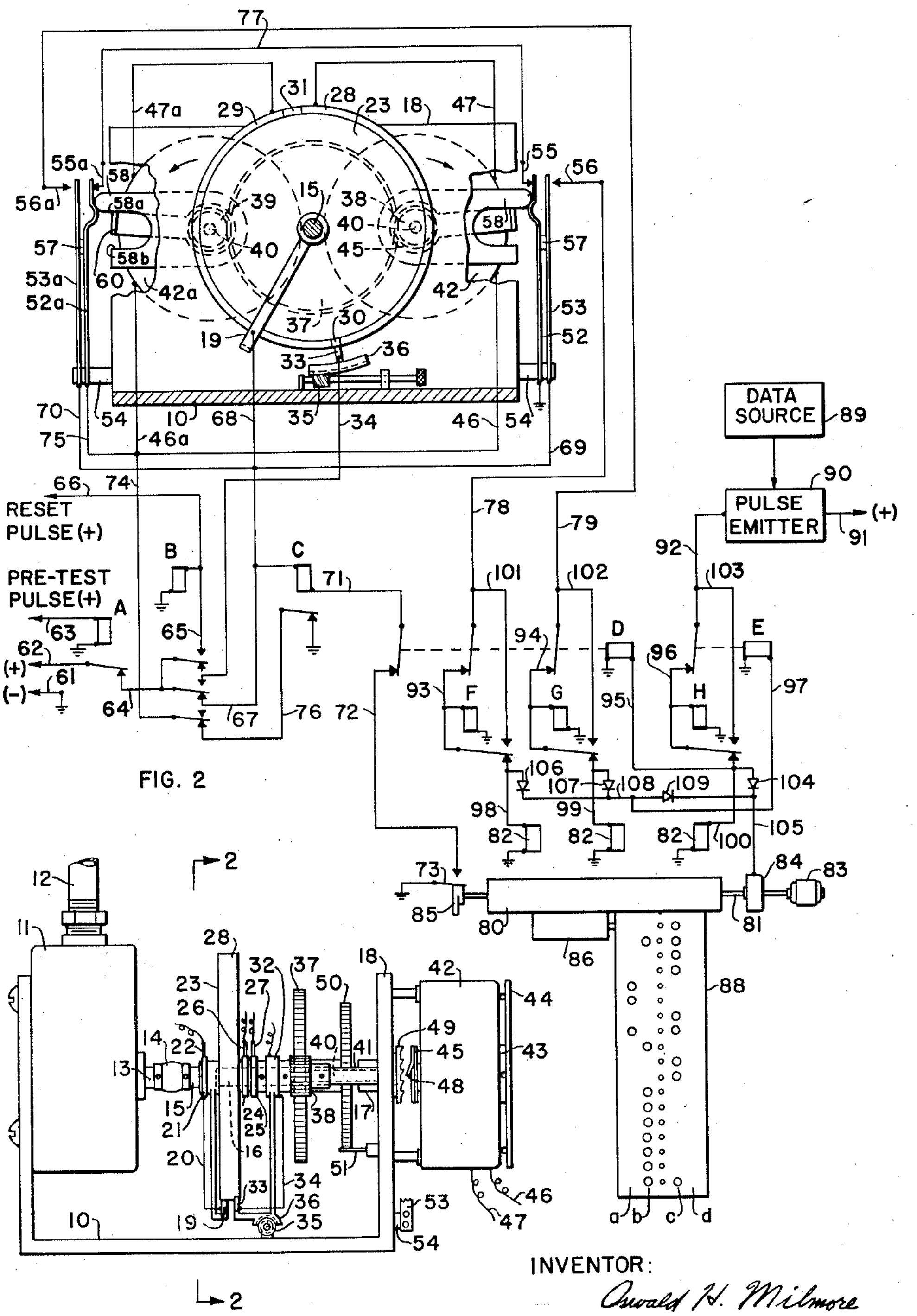
Figure 1 is an elevation view of the transducing unit, parts being broken away.
Figure 2 is a sectional view taken on the line 2—2 of Figure 1 and including in diagrammatic form the associated circuits, circuit elements, and other components of the system.

Referring to Figures 1–4, the invention is shown as applied for recording pressure and using a pressure meter having a rotary shaft output. It includes a base 10 carrying a pressure meter 11 having its input connected to a duct 12. The meter may be of any suitable type which positions a shaft 13 at an angular position determined by the pressure in the duct. The meter 11 is preferably of a type that is free from rapid oscillations in the shaft 13, e.g., by having a damping device such as a mechanical damper on the shaft or a restriction in the duct 12. The shaft is coupled by a flexible coupling 14 to the hub of an index member 15 which is freely rotatable on a shaft 16. This shaft has a bearing 17 mounted on the mounting plate 18 and is coaxial with the shaft 13. The said index member extends radially from the shaft axis and carries a narrow brush 19 which constitutes a movable index and is electrically connected by an insulated conductor 20 to an insulated commutator ring 21 on the hub. The ring makes contact with a brush 22.

Fixed to the shaft 16 is a circular follower 23 which carries commutator rings 24 and 25, coacting with brushes 26 and 27, and a pair of peripheral, arcuate electrical conductors 28 and 29 which are respectively connected by electrical circuits (not shown) to the two commutator rings. These conductors and the circuits are insulated from one another and from the shaft. The juxtaposed ends of these conductors are separated by spacing members 30 and 31, which are formed of insulating material. At least the member 30 is preferably narrow (in the circumferential direction), being only slightly wider than the brush, to permit the brush 19 to engage the spacer 30 without contact with the conductors 28 and 29 but to make electrical contact with one of these upon a small relative rotational movement.

Also cooperating with the follower is a reference index having a hub 32 mounted for free rotation on the shaft 16 and a narrow brush 35 making contact with the follower in the manner of the brush 19 but along a course which is axially offset from that of the brush 19 to permit circumferential passage without hindrance. The brush 33 is insulated from the shaft 16 and connected to an electrical circuit 34. The position of the brush 33, herein called the reference position, is adjustable by means of a worm gear 35 which is mounted on the base 10 and meshes with an arcuate gear rack 36 on the index.

For clarity the brushes are omitted from Figure 2, wherein the electrical circuits are shown to be connected directly to the brushes and the arcuate conductors on the follower.

Also fixed to the shaft 16 is a large gear 37 which meshes with a pair of pinions 38 and 39, each fast on a corresponding shaft 40 journalled in the mounting plate 18 by a bearing as shown at 41. Each shaft 40 is driven by a digital shaft pulser of any suitable design; these devices are known and, therefore, not described in detail. In brief, each shaft pulser of the design indicated includes an electromagnetic drive unit 42 or 42*a* mounted on the plate 18 and having a central operating shaft 43 which is coaxial with the corresponding shaft 40. Each operating shaft carries a rear plate 44 at one end and a front plate or collar 45 at the other and is cam-mounted so that it has simultaneous rotary and axial motions; it further has a strong operating spring (not shown) urging it to the rear position (away from the plate 18) as shown. When electric power is applied to the conductors 46 and 47 (or 46*a* and 47*a* in the case of the unit 42*a*) the shaft executes its advancing stroke, during which it moves axially in the direciton of the collar 45 and rotates through a small arc, such as 8 to 30°, remaining in advanced position so long as power is applied; when the circuit is deenergized the shaft executes its retraction stroke, driven by its operating spring to move both rotationally and axially to the initial position. The collar 45 carries a resilient, helically-shaped spring pawl 48 which is made of flat stock and has an end part projecting angularly toward an annular, serrated face of a ratchet 49 fast on the end of the shaft 40 for engagement of the end of the pawl with the serrations. When the operating shaft is retracted, as shown, the pawl is clear of the ratchet, permitting rotation of the latter in either direction free from restraint by the pawl. During the advancing stroke the spring pawl approaches the ratchet with a turning movement and, after engaging it, slides over the serrations; at the end of the stroke the pawl engages one of the teeth on the ratchet. During the retraction stroke the end of the pawl pushes the ratchet, thereby effecting a stepwise rotation of the shaft 40, the gears 38 and 37, the shaft 16 and the follower 23; at the end of this stroke the pawl is again disengaged from the ratchet. Also fixed to the shaft 16 is a detent gear 50 which coacts with a spring-loaded detent 51 on the plate 18 to position the shaft 16 at equally spaced rest positions between steps and insure advancement by equal angular distances, in this instance equal to one tooth of the gear 50. The detent further prevents rotation of the gears during the advancing stroke of the operating shaft.

The two shaft pulsers 42 and 42*a* are constructed enantiomorphically to drive their shafts 40 in opposite directions, indicated by the arrows in Figure 2, so that one operates to turn the shaft 16 in one direction and the other in the opposed direction. Because the spring pawls are normally disengaged from their ratchets neither interferes with the operation of the other, provided, of course, that they are not simultaneously energized.

Figures 4, 5:
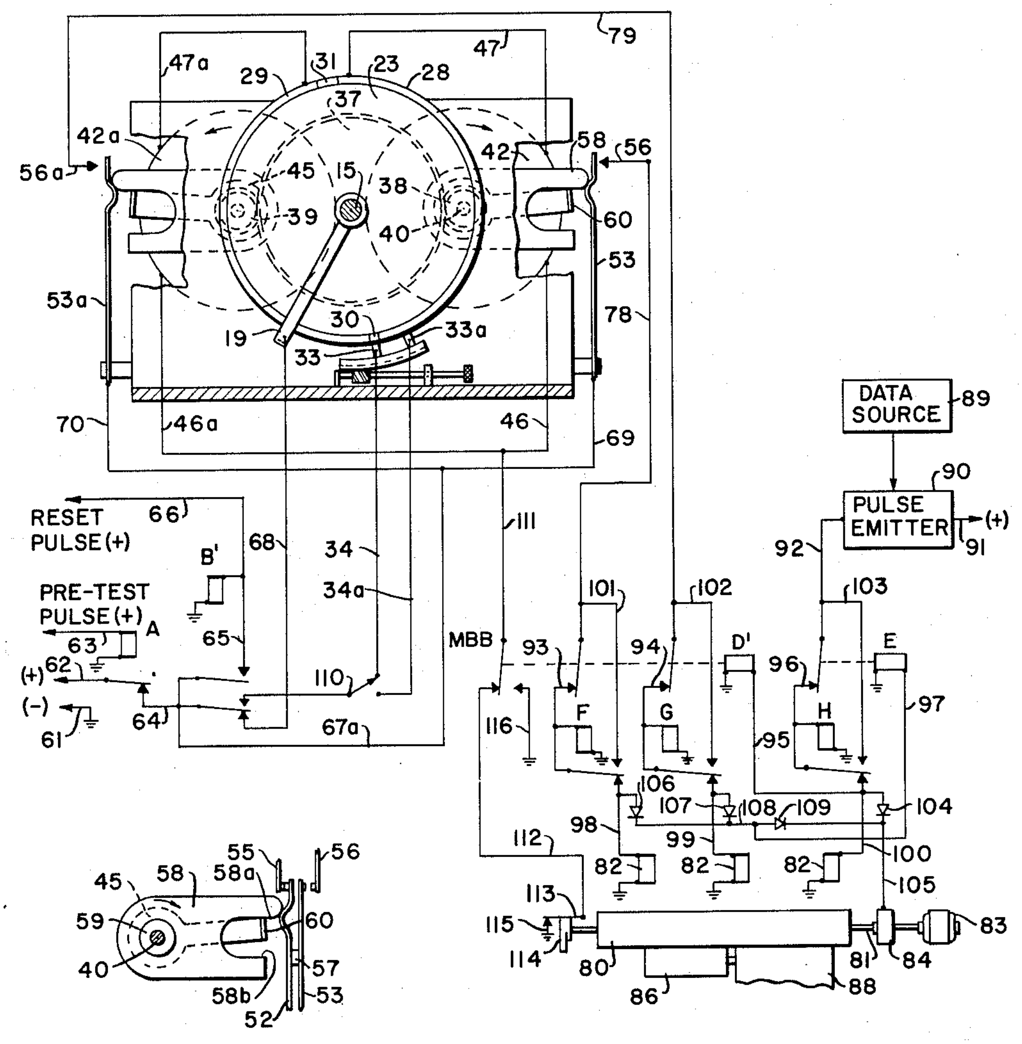
Figure 4 is a sectional view taken on the line 4—4 of Figure 3.
Figure 5 is a view similar to Figure 2 showing a modification.
Figure 3:
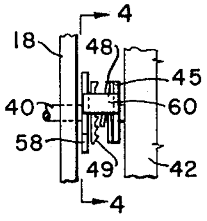
Figure 3 is an enlarged fragmentary elevation view of one ratchet and actuator for the pulsing switch.

Each shaft pulser actuates a two-pole, cam-actuated switch including a pair of leaf springs 52 and 53 (or 52*a* and 53*a*) mounted in insulated relation on the plate 18 by brackets 54 and cooperating respectively with a normally-closed back contact 55 (or 55*a*) and a normally-open make contact 56 (or 56*a*). An insulating spacer 57 between the leaves effects simultaneous operation when the spring 52 or 52*a* is engaged at a crook thereof by the rounded end of an operating cam 58 (Figures 3 and 4) which is made of insulating material and is frictionally mounted between the plate 18 and the ratchet 49 for rotation about a bushing 59 which surrounds the shaft 40. The frictional force is insufficient to rotate the shaft 40 against the force of the detent 51. The cam is bifurcated to provide circumferentially spaced abutments 58*a* and 58*b* which are alternately engaged with play by an actuating arm 60 fixed on the collar 45. During the advancing stroke of the operating shaft of the pulser the arm 60 is carried clockwise as seen in Figure 4; during the initial part of this movement it recedes from the abutment 58*a* without moving the cam, and during the final part it engages the abutment 58*b* and rotates the cam in the arrow direction to operate the leaf spring. During the retraction stroke the action is reversed and the abutment 58*a* is engaged only during the final part of the stroke to rotate the cam in the reverse direction and permit the springs to return to normal positions, as shown.

In the circuits to be described only the positive circuit is shown in full and the negative side is indicated by ground. The circuits 61 and 62 indicate a source of direct current. The positive side 62 is connected to the spring contact of a single-pole pre-test relay A, the magnet winding of which is connected between ground and control circuit 63. The normally-closed, back contact is connected via a circuit 64 to the upper two spring contacts of a three-pole reset relay B. The make contact of the upper pole is connected by a circuit 65 to one end of the magnet winding and to a reset control circuit 66, the other end of the winding being rounded.

The normally-closed, back contact of the upper pole is not used. The make contact of the second pole is connected by the circuit 34. The normally-closed, back contact of the second pole is connected by a circuit 67 to one end of the magnet winding of an interrupter relay C and, via branch circuits 68, 69 and 70 to the movable index brush 19 (through the brush 22) and the outer switch springs 53 and 53*a*, respectively. The other side of the magnet winding of relay C is intermittently connected to ground via circuit 71, the left pole and back contact of a delay relay D (to be described), circuit 72, and a normally-open, cam-actuated switch 73, described hereinafter. The lower spring contact of relay B is connected via a circuit 74 to the circuits 46 and 46*a* of the shaft pulsers and, via circuit 75, to the leaf spring 52*a*. The remaining leads 47 and 47*a* from the shaft pulsers are electrically connected to the arcuate conductors 28 and 29, respectively, of the follower (by way of the brushes 26 and 27). The make contact of the lower spring contact, relay B, is not used; the back contact thereof is connected via a circuit 76 to the spring contact of the relay C, the back contact of which is grounded. The inner sections of the cam-actuated switches on the shaft pulsers are connected in series as follows: the back contact 55*a* is connected by a circuit 77 to the back contact 55 and the spring 52 is grounded.

The two outer sections of the switches on the shaft pulsers, including the normally-open make contacts 56 and 56*a*, constitute the pulse emitters of the transducer and are connected by circuits 78 and 79, respectively, to a recorder, such as a motorized tape-punching machine diagrammatically indicated at 80. Such machines are known per se and will not be described in detail herein. The machine includes an operating shaft 81 and a plurality of punches, each controlled by a separate solenoid or code magnet 82 which, when energized for a short period, at least 5 to 30 milliseconds, depending upon the design of the machine, but not as long as the cycle time of the shaft, arms the punch so that the punch is depressed by the shaft at the next revolution thereof. The machine further has a continuously operating electric motor 83 the output shaft of which is coupled through a magnetically operated, single-revolution clutch 84 to the operating shaft 81. When the clutch is energized for a period like that described above for the code magnets it rotates the shaft 81 for one revolution; it may be energized simultaneously with the code magnets to effect punching in the same cycle. The shaft carries a cam 85 which closes the switch 73 momentarily during the revolution. The machine further includes a tape-advancing mechanism, represented at 86, which is internally connected to the shaft 81 to advance the paper tape 88 one step following each perforation.

The recorder is used to record a plurality of items of data in different channels thereof, one channel being used to record each monotonic data and two for each item of fluctuating data. It will be understood that the machine may include any desired number of punches for recording in as many data channels although, for purposes of illustration, the use of only three channels *a*, *b* and *c* will be described. Thus, the box 89 represents a source of monotonic data, which drives a pulse emitter 90 having a direct current input circuit 91 and emitting a series of electrical pulses in circuit 92; these may be isochronistic pulses when the data source is a timer. To prevent interference, as would occur if two pulses from different data sources are emitted in such close succession that the recorder has not completed one operating cycle before the second pulse occurs, the circuits 71, 78, 79 and 92 are led through fast-acting delay relays D and E.

The relay D has three poles; the spring contacts are connected respectively to the circuits 71, 78 and 79, and the circuits are completed via the back contacts and circuits 72, 93 and 94. The magnet winding of relay D has one terminal grounded and the other is energized via a circuit 95 to operate while a pulse from the circuit 92 is being transmitted to the recorder. The spring contact of relay E is connected to the circuit 92, the circuit being continued via the back contact through a circuit 96; the magnet winding has one terminal grounded and the other is energized through a circuit 97 to operate while a pulse is being transmitted to the recorder from circuit 78 or 79.

To limit the durations of the pulses, thereby insuring that each code magnet is armed only once by each pulse although the pulse duration exceeds the operating cycle of the recorder operating shaft, the circuits 93, 94 and 96 may be connected through pulse-limiting relays F, G and H, respectively. Thus, each of these circuits is connected to the magnet winding of the respective relay and also to the respective spring contacts. The magnet windings are grounded. The relays F, G and H have operating characteristics such as to operate after a time slightly in excess of the time required to insure operations of the code magnets 82 and the clutch 84 but less than the cycle time of the shaft 81, e.g., 6 to 50 milliseconds. The normally-closed, back contacts of these relays are connected via circuits 98, 99 and 100 to the respective code magnets 82 and the make contacts thereof are connected via branch circuits 101, 102 and 103 to the pulse circuits 78, 79 and 92, respectively, to by-pass the delay relays D and E. The circuit 100 is also connected directly to the circuit 95 and, through a diode 104 and a circuit 105, to the magnetic clutch 84. The circuits 98 and 99 are connected via diodes 106 and 107 to a common circuit 108 which is connected directly to the circuit 97 and, via a diode 109, to the circuit 105.

*Operation of first embodiment*

*a. Reset.*—Initially the follower 23 is brought to the reference position shown in Figure 2 by applying a short pulse to the circuit 66, thereby operating the relay B, which locks through its upper make contact and circuits 65, 64 and 62. This removes the ground via circuit 76 from the circuit 74 and applies power from circuit 64 to the circuit 34 and brush 33 at the reference position. Assuming the follower to be initially to a clockwise position from that shown, brush 33 makes contact with the conductor 28, thereby applying power through the circuit 47 to the shaft pulser 42. The other circuit 46 of this pulser is grounded through the circuit 75, switch 52*a*—55*a*, circuit 77 and switch 52—55, whereby the shaft 43 of the pulser 42 makes an advancing stroke. This causes the arm 60 to turn the operating cam 58 near the end of the stroke to move the springs 52 and 53 and interrupt the ground circuit at the contact 55. The pulser is thereby deenergized, causing its shaft to make a retracting stroke, thereby rotating the ratchet 49 and pinion 38 in a clockwise direction which, in turn, turns the shaft 16 and follower 23 in a counter-clockwise direction; near the end of this stroke the arm 60 returns the cam 58 to the normal position shown, to permit the springs 52 and 53 to return to normal, reestablish the ground to the circuit 46 and cause the pulser to repeat the operation. This sequence is repeated until the insulating separator 30 is opposite the brush 33; this removes power from the conductor 28 and circuit 47. Had the follower been initially displaced counter-clockwise from the position shown a similar sequence of steps would have occurred, with the difference that the conductor 29, circuit 47*a* and pulser 42*a* would have been active to rotate the follower in a clockwise direction and the ground would have been interrupted at each step at the contact 55*a*. During the resetting operation no pulses are emitted through circuits 78 and 79 because circuits 67, 69 and 70 are not energized. The follower remains in the reference position until it is desired to commence a record.

*b. Pre-test pulse.*—When it is desired to initiate a test record a pulse is applied to the circuit 63, thereby momentarily operating the relay A; this interrupts the power supply to the circuit 64 through the back contact of relay A, releasing the relay B. Thereby the circuit 74 is connected to ground through the back contacts of the lowermost pole of relay B and of relay C, by-passing the interrupters 52—55 and 52*a*—55*a*. Also, when relay A is released, power is applied to the circuit 67 through the back contact of the second pole of relay B to energize the pulse emitters, while circuit 34 to the brush 33 remains deenergized.

*c. Test recording.*—The test recording starts immediately upon the cessation of the pre-test pulse. Power from the circuit 67 is applied via circuit 68 to the movable index brush 19 and thence to the conductor 28 or 29 on the follower, in accordance with the direction in which the brush 19 is displaced from the insulating separator 30 by the action of the pressure meter 11 through the coupling 14. This activates the shaft pulser 42 or 42*a* in the manner previously described for the resetting operation, with the difference that the interruption of the back contact 55 or 55*a* does not suffice to open the circuit to ground, which is continued through circuit 76; instead, interruption is effected by the relay C as described hereinafter. Also, during the advancing stroke of the shaft pulser the leaf spring 53 or 53*a* (both of which are now energized from circuit 67 via circuits 69 and 70) engages its make contact to appply a positive pulse to the circuit 78 or 79 to indicate that the shaft pulser is prepared to rotate the follower one step in the counter-clockwise or clockwise direction, respectively. The action will be further described with the assumption that the relative positions of the brush 19 and follower are as shown in Figure 2, whereby the pulser 42*a* is activated and the circuit 79 is energized.

The positive pulse from circuit 79 is transmitted via the third (right) section of the relay D, circuit 94, the back contact of relay G, and circuit 99 to the corresponding code magnet 82 of the tape-punching machine 80 to arm the second punch thereof. Simultaneously the pulse is transmitted through the diode 107, circuit 108, diode 109, and circuit 105 to the clutch 84. This causes a hole to be punched in channel *b* of the paper tape 88 and the tape to be advanced by one step by the mechanism 86. Rotation of the operating shaft 81 and cam 85 causes the switch 73 to be closed momentarily, thereby applying a ground through the circuits 72 and 71 to the magnet winding of relay C; the latter operates momentarily, thereby interrupting momentarily the ground through circuits 76, 74 and 46*a* to the shaft pulser 42*a* and permitting the latter to effect its retraction stroke. While the operating shaft of the pulser was advanced the spring 52*a* was away from its back contact 55*a*, thereby permitting the relay C to interrupt the ground return circuit to the shaft pulser. The follower 23 is thereby advanced one step in a clockwise direction. The foregoing cycle of operations is repeated until the insulating separator 30 is opposite the brush 19, at which time the follower is in registry with the movable index and further pulsing ceases. In the drawing a series of seven holes appear in channel *b*, indicating that seven steps or operating cycles were required to effect registry. Each of these steps or holes can represent a convenient unit of change in the magnitude of the fluctuating variable, e.g., a change in pressure of 10 lbs. per sq. in. (p.s.i.). If the reference position of brush 30 represented a pressure of 600 p.s.i. and the shaft directions are such that a clockwise rotation (Fig. 1) represents an increase, the seven initial steps show the pressure at the start of the test period to have been 670 p.s.i.

When the pressure in the duct 12 changes, the movable index is rotated to offset the brush 19 from the separator 30, thereby energizing the conductor 28 or 29 to cause one or more cycles of operation until the follower is again in registry. Thus, the tape record shows that the pressure later rose to 680 p.s.i., then dropped successively to 670 and 650 p.s.i., (indicated by the holes in the channel *a*) and again rose to 660 p.s.i.

The relays F and G are optionally provided to limit the durations of the pulses transmitted to the punching machine. Thus, when pulses were transmitted through the circuit 79 in the operation described above, the relay G was operated to break the back contact to circuit 99; because of the relay characteristics this occurred not sooner than 5 to 30 milliseconds (in accordance with the characteristics of the recording machine 80) after the start of the pulse and not later than the cycle time of the machine, e.g., 6 to 50 milliseconds. This operation closed the make contact and locked the relay in operated position via the circuit 102 so long as the input circuit 79 remained energized, regardless of whether the relay D operated during this time period. This prevented the code magnet 80 from being once again energized from the same pulse in the event that the shaft pulser 42 completed its retraction stroke after completion of the cycle of the operating shaft of the recording machine. This delay circuitry may, of course, be omitted when the pulse emitter operates rapidly and the cam switch 73 is closed sufficiently early during the operating cycle.

The data source 89, which is also active during the recording operation, is assumed to be a timer. The pulse emitter 90 then emits isochronistic pulses which should be somewhat longer, e.g., at least twice as long, as the operating cycle of the recording machine. These pulses are transmitted through the circuit 92, the contacts of relay E and the pulse-limiting relay H, which operates as described for the relay G, and the circuit 100 to the code magnet of channel *c*; the pulse is also transmitted through the diode 104 and circuit 105 to the clutch to cause punching. Simultaneous pulses from the circuits 92 and 78 or 79 are transmitted simultaneously, as described above, thereby punching two holes simultaneously, as shown in Figure 1 for the first, fourth and eighth holes in channel *c*. However, when one of these occurs slightly sooner than the other the latter is delayed as follows: Assuming that the pulse from circuit 79 occurs first, circuit 97 is energized through the contacts of relay G and relay E operates immediately, thereby blocking transmission of the pulse from the circuit 92. Relay E remains energized until the circuit 99 is deenergized; this occurs late in the operating cycle of the shaft 81. Thereafter the relay E releases to transmit the time pulse. Conversely, when the time pulse from circuit 92 arrives first, circuit 95 is energized through the contacts of relay H and relay D operates immediately, and the pulse from circuit 79 is blocked until the relay D releases after the circuit 100 is deenergized. To prevent the relay C from operating when a time punch is being made in channel *c* in the example just described the circuit 73 is also interrupted by the first pole of relay D; were this precaution not taken the shaft pulser would complete its retraction stroke without a punch being made in channel *a* or *b* of the tape.

At the end of the test a reset pulse is applied to the circuit 66, with the consequence described above.

As was noted above, the meter 11 should be free from rapid oscillations, such as would cause the brush 19 to make contact alternately with the conductors 28 and 29 in such rapid succession that one shaft pulser is energized before the other has made a retraction stroke. Since the pulses may be made as rapidly as five to twenty per second, only moderate damping is usually sufficient. It is evident, moreover, that instead of damping the meter it is possible to employ electrical circuit elements to prevent simultaneous energization of both shaft pulsers.

It will be noted from Figure 1 that the punches in channel *c* represent equal time intervals, and that the pressure punches are in orthochronistic relation thereto. Thus, if the time interval is one minute, the record shows that the pressure remained 670 p.s.i. during the second minute, rose to 680 during the third minute, fell to 670 at the end of the third minute, fell to 650 during the fifth minute and rose to 660 at the end of the seventh minute.

Such a record can be easily read by automatic tape readers and analyzed in various machines, or used by automatic plotting devices.

*Second embodiment*

Figure 5 shows several modifications which may be applied individually to the arrangement of Figures 1–4. In this embodiment the recorder receives pulses corresponding to all steps taken by the transducer, during the resetting operation as well as during the test; a plurality of reference positions are provided; and the shaft pulse circuits are interrupted by the cam switch at the recorder, which is in this instance a normally closed switch. Like numbers denote parts previously described.

The transducer is constructed as previously described with the difference that the interrupter sections 52—55 and 52a—55a of the cam-actuated switches are omitted and the reference index has, in addition to the brush 33, an auxiliary brush 33a which is connected by a circuit 34a and switch 110 to be connected to the lower make contact of the reset relay B′ which has only two poles. The switch 110 may be set to select either the brush 33 or 33a to select either reference position. The circuits 69 and 70 from the pulsing switches are connected by a circuit 67a directly to the circuit 64 so as to be active whenever the shaft pulsers operate.

The relay C is omitted and the return circuits 46 and 46a of the shaft pulsers 42 and 42a are connected by a common circuit 111 directly to the first (left) spring contact of a blocking relay D′ having make-before-break contacts. The normally closed, back contact is connected by a circuit 112 to a normally closed switch 113 which is operated by a cam 114 on the operating shaft; the switch is further connected to ground through a circuit 115. The make contact of relay D′ is grounded through a circuit 116.

Other parts are constructed as previously described.

*Operation of second embodiment*

*a. Reset.*—Resetting is effected by a short pulse through circuit 66, resulting in the operation of relay B′, which locks itself. This causes the operations described above for the first embodiment with the following differences: the switch 110 is positioned to select the desired reference position. Positive pulses are emitted through circuit 78 or 79 during the resetting operation to cause the machine to make a punch for each step of the follower. During each punching operation the switch 113 is momentarily opened, thereby deenergizing the active shaft pulser to enable it to make its retraction stroke and advance the follower, until the spacer is in registry with the selected brush 33 or 33a.

*b. Pre-test pulse.*—A pre-test pulse applied to the circuit 63 operates the relay A; this interrupts the power supply to the circuit 64 to release the relay B′; when the pulse ends power is applied to the circuit 68 and the recording commences.

*c. Test recording.*—Recording occurs as was described for the first embodiment, with the difference that the switch 113 controls the operation of the shaft pulsers. When the relay D′ is operated by a pulse from the pulse emitter 90 to block the transmission of a pulse from circuits 78 and 79 the circuit 111 is grounded through the circuit 116 to prevent the opening of the switch 113 from breaking the ground circuits to the shaft pulsers. Hence if one of the latter is energized its operating shaft remains in advanced position and the pulse in circuit 78 or 79 continues until the ensuing operation of the shaft 81, during which the previously blocked pulse is recorded.

This embodiment provides a check on the accuracy of the system. By resetting the transducer at the end of a recording operation the follower is returned to the reference position and the steps required to effect this are recorded in channel *a* or *b*. Hence the total number of holes punched during the combined test recording and subsequent resetting operations must be the same for channels *a* and *b*.

The auxiliary brush 33a may be used to reduce the length of the record by resetting the follower to a position more nearly at the mean pressure to be recorded. It may also be used in conjunction with the brush 33 to check the operation of the system. Thus, the correct number of steps between these two brushes being known, after a reset pulse is applied to circuit 66 and the follower has come to one of its reference positions, operation of the switch 110 will always cause the recorder to punch a corresponding number of holes in channel *a* or *b*.

*Third embodiment*

Figure 6:
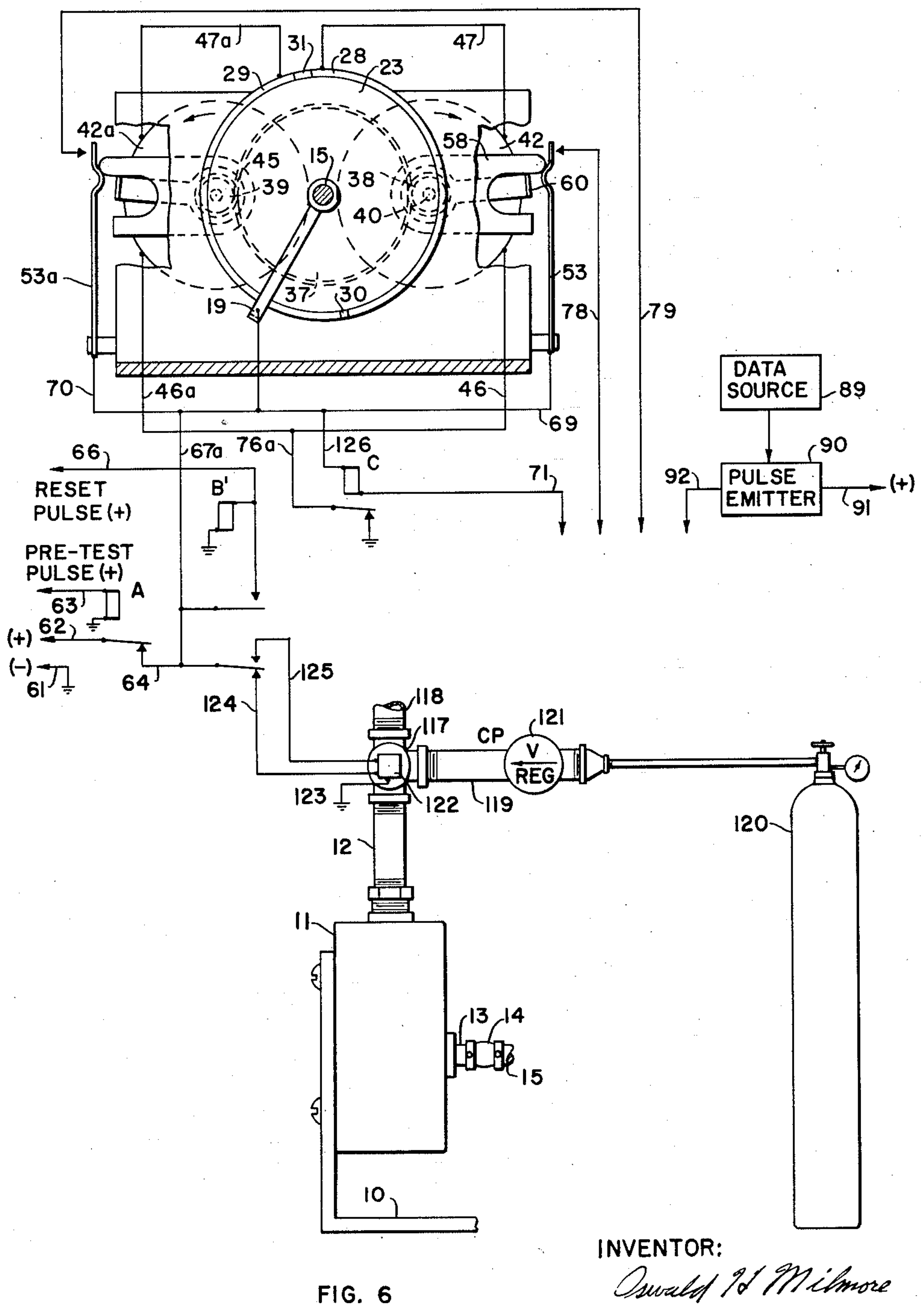
Figure 6 is a combination view showing a second modification of the transducer and other components in the aspects of Figures 1 and 2.

Figure 6 shows a modified arrangement wherein the operation of the shaft pulsers is controlled by a normally-open cam switch on the recording machine, as in Figure 1 and the pulses are recorded both during the test and resetting periods, as in Figure 5. It differs in the arrangement of the pulsing switches and the means for resetting the follower. Like reference numbers denote parts previously described.

The input duct 12 to the pressure meter 11 is connected by an electrically-operated, three-way valve 117 selectively to a pipe 118 leading to the pressure to be measured and to a pipe 119 which is maintained at a constant or predetermined reference pressure. This pressure may be generated by any suitable means; it may include a source of gas under pressure, such as a cylinder 120 containing nitrogen or other inert gas and a pressure-regulator 121 of the bleed type for maintaining the proper pressure within the pipe 119. Because of its bleed feature the valve permits excess gas to escape from the pipe 119 should the pressure therein be higher than the reference pressure. The valve 117 has a valve operator 122 connected to ground by a circuit 123 and, by circuits 124 and 125, to the back and make contacts, respectively, of the lower pole of the reset relay B′, so that when the latter is released the circuit 124 is energized from circuits 62 and 64 to connect the duct 12 only to the pipe 118. Energization of the circuit 125, effected when the relay B′ is operated, positions the valve 117 to connect the meter only to the pipe 119.

The reference index and brush 33 are omitted in this embodiment. The return circuits 46 and 46a from the shaft pulsers are connected by a circuit 76a directly to the spring contact of interrupter relay C, which has its back contact grounded. One side of the magnet winding of this relay is connected by circuits 126 and 67a to the power circuit 64. The springs 53 and 53a are also connected to the circuit 67 through circuits 69 and 70. The interrupter sections of the cam-actuated switches are omitted. Other circuits are as described for Figures 1 and 2, and it is understood that the circuits 71, 78, 79 and 92 are connected to a recorder in the manner shown in Figure 2.

*Operation of third embodiment*

*a. Reset.*—When a short pulse is applied to circuit 66 the relay B′ operates and locks itself through its upper make contact, thereby applying power from circuit 64 to the circuit 125 through the lower make contact and connecting the pressure meter 11 to the reference pressure in the pipe 119. This causes the output shaft 13 to rotate, turning the movable index 15 and brush 19 to the reference position. Because the brush 19 is energized via circuits 67a and 64, the shaft pulsers are immediately effective to step the follower 23 into registry with the brush; during this operation pulses are produced in the circuit 78 or 79 to actuate the punching machine and stepping is controlled by this machine through the relay C as described for the first embodiment.

*b. Pre-test pulse.*—A pre-test pulse applied to the circuit 63 operates the relay A to interrupt the power supply in circuit 64 to release the relay B′, which thereupon releases. When the pulse ends relay A releases and power is restored, being applied through the lower make contact of relay B′ to the circuit 124 to operate the valve 117 and connect the meter 11 to the input pipe 118. Power being also restored to the circuit 67*a*, recording commences at this time.

*c. Test recording.*—Operations are as described previously for the first embodiment.

It will be noted that moving the movable index to the reference position by applying a reference pressure to the meter obviates the need for calibration of the meter in that it later functions as a differential meter, to position its output shaft in accordance with the difference between the reference and measured pressures.

I claim as my invention:

1. In a system for producing data on a fluctuating variable in two channels, the combination of a movable index, a device for positioning the said index in accordance with the magnitude of said variable, a follower including drive means to effect two-directional movement of the follower into registry with the index, a second index disposed at a reference position and means for moving said follower into registry with said second index, and signal-emitting means having two outputs and operatively connected to said follower for emitting series of signals in accordance with the movements of the follower such that the numbers of signals at the two outputs indicate respectively distances of the movements in opposite directions.

2. In a system for producing data on a fluctuating variable in two channels, the combination of a movable index, a device for positioning the said index in accordance with the magnitude of said variable, a follower including drive means to effect two-directional movement of the follower into registry with the index, means for resetting the follower to a reference position, and signal-emitting means having two outputs and operatively connected to said follower for emitting series of signals in accordance with the movements of the follower such that the numbers of signals at the two outputs indicate respectively distances of the movements in opposite directions, a data-recording machine having a plurality of input channels, means operatively connecting each of said outputs to a different one of said data input channels to cause the machine to record the number of signals in the respective output channels, and means responsive to the operation of the recording machine for controlling the movement of the follower so as to restrain movement thereof until completion of each recording operation.

3. In a system for making a record of a fluctuating variable in two channels, the combination of a movable index, means for measuring said variable including a movable element connected to the index for positioning the index in accordance with the magnitude of the said variable, a follower including drive means to effect two-directional, stepwise movement of the follower into registry with the index, means for resetting the follower to a reference position, and electrical pulse-emitting means having two output terminals and operatively connected to said follower for emitting a series of electrical pulses corresponding to the steps in the movement of the follower such that the numbers of pulses at the two terminals indicate respectively the distances of movements in opposite directions, said means for resetting the follower including means for preventing the transmission of pulses from the pulse emitting means to the recorder during the resetting operation, a multi-channel tape-punching machine having a plurality of independent punches and associated punch-control elements, and electrical circuit means connecting each of said output terminals to a different one of said punch control elements.

4. A system according to claim 2 wherein said means for resetting the follower includes means for positioning the said index at the reference position.

References Cited in the file of this patent

UNITED STATES PATENTS

| | | |
|---|---|---|
| 359,210 | Haight | Mar. 8, 1887 |
| 713,258 | Weston et al. | Nov. 11, 1902 |

FOREIGN PATENTS

| | | |
|---|---|---|
| 223,270 | Great Britain | Oct. 8, 1924 |
| 525,074 | Belgium | Dec. 31, 1953 |